INVENTORS
ABBOTT F. MAYER
HARRIS A. STOVER
BY Moody & Hallacher
ATTORNEYS

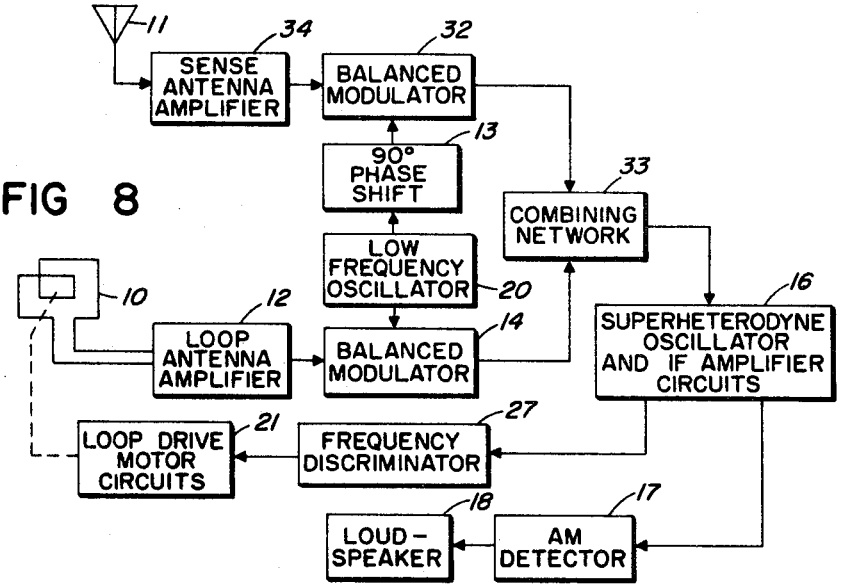
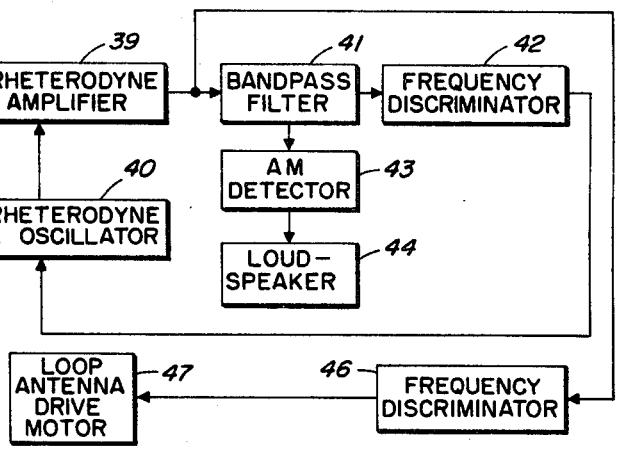

United States Patent Office 3,390,392
Patented June 25, 1968

3,390,392
ADF SYSTEM EMPLOYING ANGLE
MODULATION
Abbott F. Mayer, Marion, and Harris A. Stover, Cedar Rapids, Iowa, assignors to Collins Radio Company, Cedar Rapids, Iowa, a corporation of Iowa
Filed July 12, 1965, Ser. No. 471,072
4 Claims. (Cl. 343—117)

ABSTRACT OF THE DISCLOSURE

This invention describes an ADF (automatic direction finding) system which employs internally generated phase modulation instead of the internally generated amplitude modulation commonly employed in ADF systems. The inventive system has the advantage that amplitude modulation of the received signal cannot affect the direction finding properties of the system. The advantages are achieved by elimination of the 90° phase shift of the loop antenna input to minimize amplitude modulation. The commonly used systems employing amplitude modulation are disturbed when the received signal has amplitude modulation in the frequency range of the internally generated amplitude modulation.

This invention relates generally to an automatic direction finder and particularly to an ADF system utilizing angle modulation.

This invention describes an ADF (automatic direction finding) system which employs internally generated phase modulation instead of the internally generated amplitude modulation commonly employed. The inventive system has the advantage that amplitude modulation of the received signal cannot affect the direction finding properties of the system. The commonly used systems employing amplitude modulation are disturbed when the received signal has amplitude modulation in the frequency range of the internally generated amplitude modulation.

This distortion is objectionable in that it results in an erroneous system output and thereby makes it difficult to accurately determine the direction from which the signal is being received.

It is therefore an object of this invention to provide an automatic direction finding system which is insensitive to undesirable amplitude modulated signals received from outside sources.

It is another object of this invention to provide an ADF system which is insensitive to extraneous amplitude modulated signals and noise and wherein a loop antenna is controlled in a manner indicating the direction from which a signal is received.

Still another object is to provide such a system wherein the rotation of a loop antenna is controlled by angle modulated signals so that the direction from which said signals are coming can be positively and accurately determined.

Further objects, features, and advantages of the invention will become apparent from the following description and claims when read in view of the accompanying drawings, in which:

FIGURES 4, 5, 6, and 7 show vector diagrams useful in explaining the operation of the various systems described herein;

FIGURE 8 shows a system which is different from all the previously shown systems; and FIGURE 9 shows a system for adding automatic frequency control to the system of FIGURE 8.

Figure 1:
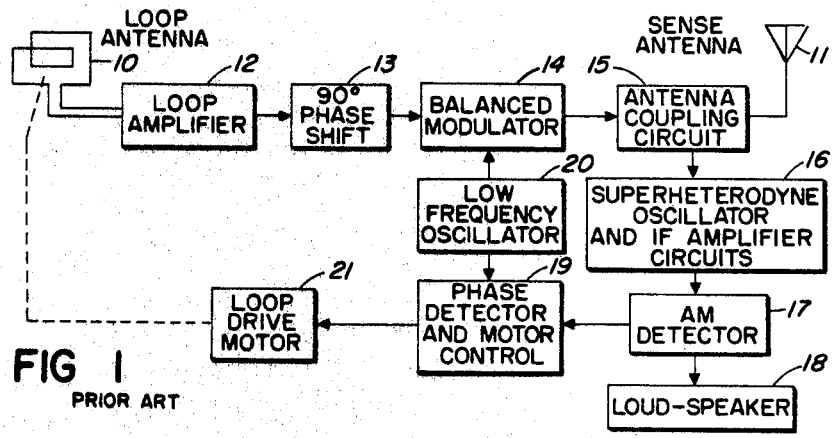
FIGURE 1 shows a typical amplitude modulated system of the type well known in the art.

FIGURE 1 shows a commonly used system. A loop antenna 10 is connected to balanced modulator 14 through a serial arrangement of amplifier 12 and phase shifting network 13. Sense antenna 11 and balanced modulator 14 both are coupled to coupling circuit 15. The output of coupling circuit 15 is superheterodyned at circuit 16, detected at AM detector 17 and ultimately phase compared with the signal from low frequency oscillator 20 in phase detector 19. The phase comparison signal from detector 19 is used to drive motor 21 which, in turn, rotates loop antenna 10 to face in the direction of the received amplitude modulated signal.

The loop antenna 10 has the characteristic that a vertically polarized signal arriving from one side of a vertical plane through the center of the loop and normal to the plane of the loop induces a voltage of opposite phase from a signal arriving from a point on the other side of this plane. By making use of this property along with a reference phase established by a capacitive "sense" antenna 11 a servomechanism may be caused to rotate loop antenna 10 so that the signal arrives from a particular direction with respect to said loop antenna.

Since the voltage from a loop antenna is 90° out of phase from the voltage from a capacitive antenna the 90° phase shift 13 following loop amplifier 12 makes the phase of the signal into balanced modulator 14 either in phase with the signal from the sense antenna 11 or in phase opposition to the signal from the sense antenna 11.

In balanced modulator 14 a pair of modulation sidebands are produced but the carrier frequency is deleted (see Electronic Designers' Handbook; Landee, Davis and Albrecht, McGraw-Hill, 1957, pages 5–25). These sidebands are then added to the carrier from the sense antenna 11 to produce an amplitude modulated wave as shown in the vector diagram of FIGURE 4. Vector 36 represents the carrier signal received from sense antenna 11, while vectors 37 represent the sidebands received from balanced modulator 14. The changing phase of each sideband 37 relative to the carrier phase 36 is indicated by small arrows 38. This indicates that at the instant shown in the diagram the amplitude (envelope) is increasing. If the phase of the signal from the loop antenna had been reversed due to a different direction of arrival, the phase of both sidebands 37 would have been reversed as shown in FIGURE 5 and the amplitude (envelope) would have been decreasing, that is, the modulation envelope would also have been reversed in phase. Thus, the phase of the modulation envelope compared with the modulating oscillator phase is dependent upon the relative phase of the signals from the loop antenna and the sense antenna. By comparing the phase of the demodulated signal with the phase of the oscillator a motor may be driven in the correct direction to point the correct null of the loop antenna in the direction of arrival of the signal.

Considering now the situation that exists when the 90° phase shift network 13 of FIGURE 1 is omitted. The signal from loop antenna 10 and the signal from sense antenna 11 will always differ by 90°, that is the signal from loop antenna 10 will either lead or lag the signal from sense antenna 11 depending upon which side of the normal to the plane of loop antenna 10 is nearest the direction of arrival of the signal. Now the vector diagram of FIGURE 4 may be redrawn as FIGURE 6 and the vector diagram of FIGURE 5 may be redrawn as FIGURE 7.

Referring to FIGURE 6 it is seen that the resultant vector is no longer a vector with the same phase as the received carrier but modulated in amplitude, as it is in FIGURES 4 and 5. It is now modulated in both phase and amplitude, primarily phase modulation unless the sidebands are large. It will also be noted that the phase modulation in FIGURE 7 is reversed from that of FIGURE 6 indicating that reversing the phase of the signal into the balanced modulator will reverse the phase of the phase modulation relative to the modulating signal. By detecting this phase modulation and using it in a manner analogous to that employed for the previous amplitude modulation system we will again have a system which will point the desired null of loop antenna 10 in the direction of arrival of the received signal. However, since the antenna pointing signal is phase modulated it can be differentiated from any amplitude modulation on the received signal that may have a frequency near the frequency of modulating oscillator 20 in the receiver. This could not be done when amplitude modulation was employed as it is in the system shown in FIGURE 1.

Figure 2:
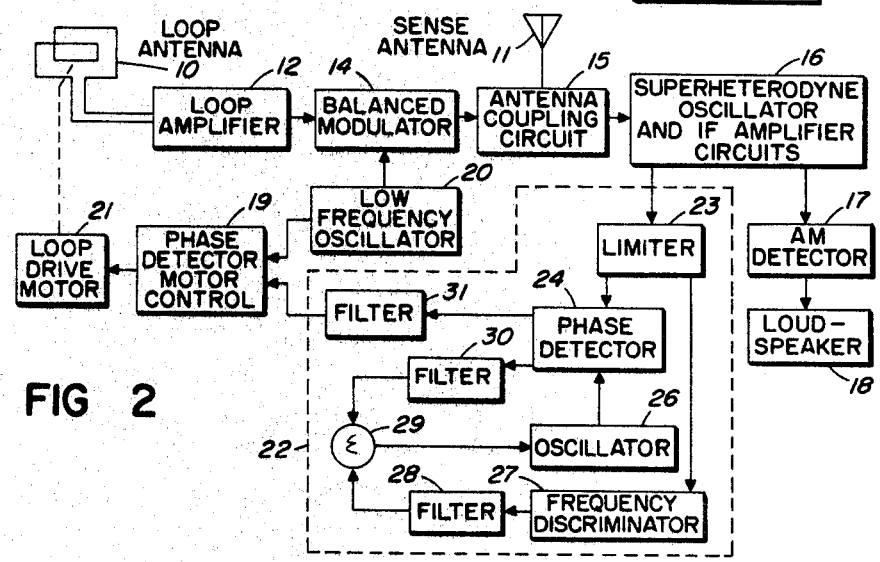
FIGURE 2 shows a phase modulated ADF system in accordance with the inventive concepts of this invention.

FIGURE 2 is a block diagram of a receiver employing phase modulation in order to avoid interference with the antenna pointing servo due to amplitude modulation components in the received signal. It should be noticed that the system of FIGURE 2 is the same as the AM system of FIGURE 1 except for the omission of 90° phase shift network 13 and the addition of demodulator 22 shown within dashed lines. The demodulator 22 has been added to demodulate the phase modulation. In demodulator 22 the limiter 23 eliminates any amplitude modulation and is not essential to the operation of the system. Phase detector 24, filter 30, and oscillator 26 comprise a phase locked loop to lock oscillator 26 to the carrier frequency from limiter 23. Frequency discriminator 27 is used to pull oscillator 26 within the capture range of the phase locked loop. A resistor summation network 29 is used to combine the outputs from phase detector 24 and frequency discriminator 27. When oscillator 26 is very far off frequency very little voltage from phase detector 24 is applied to oscillator 26 because it cannot pass the low pass filter 30. However, under these conditions a relatively large voltage is produced by frequency discriminator 27 which pulls oscillator 26 into the capture range of the phase locked loop. Since filter 30 will not pass the phase modulation frequency the phase locked loop will not be able to follow the modulation and the demodulated phase modulation signal will appear at the output of phase detector 24. This is then passed through a filter 31 to remove any extraneous high frequency noise and compared with the phase of low frequency oscillator 20 to determine the direction to turn loop antenna 10 to reach the desired null.

It should be pointed out that if balanced modulator 14 shown in FIGURE 2 is made linear and low frequency oscillator 20 produces a sine wave, sinusoidal phase modulation will be produced by the system. Sinusoidal phase modulation is the same as sinusoidal frequency modulation except for a 90° phase shift and may be detected directly by a frequency discriminator. Under these conditions, blocks 24, 26, 29, 30, and 31 of FIGURE 2 may be omitted and the output of frequency discriminator 27 may be supplied directly to phase detector motor control 19. This considerably reduces the complexity of the detection equipment but makes the balanced modulator more difficult to achieve as a higher degree of linearity is required. The exact phase relationship required by the phase detector motor control 19 depends somewhat upon the particular implementation employed. For this reason any phase shift networks required for a particular implementation must be included in the control. (A 90° phase change will be required when changing from the phase detector to the discriminator.) The best implementation for a system depends somewhat on a compromise between the difficulties of modulation and demodulation as described above. A system utilizing a linear balanced modulator 14a is shown in FIGURE 3.

Another variation of the ADF system described hereinabove does not require a phase comparison with the modulating oscillator. In this manner it differs from the existing amplitude modulated system, and also the phase modulation systems described above. For a description of this system reference is made to FIGURE 8.

Figure 3:
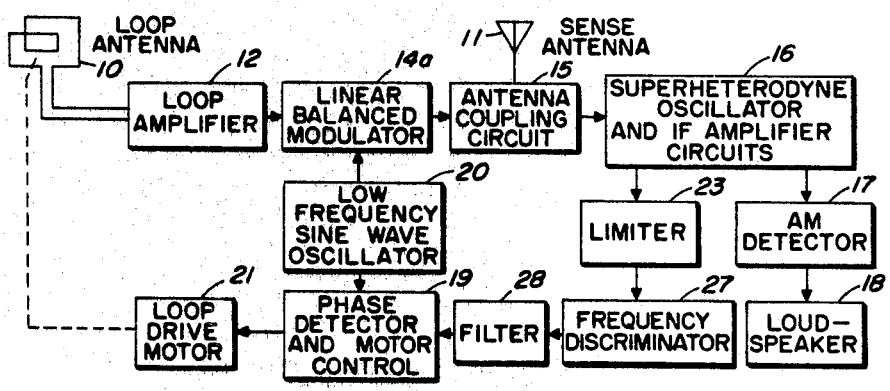
FIGURE 3 shows another phase modulated ADF system in accordance with the inventive concepts of this invention.

This system shows loop antenna 10 and sense antenna 11 similar to the systems of FIGURES 2 and 3. However, in this system the output of each antenna is fed to a balanced modulator, 32 and 14 respectively. The modulating signal for both modulators is supplied by low frequency oscillator 20. As shown, the oscillator signal is phase shifted 90° by phase shifter 13 before going to modulator 32. The reason for this is explained hereinafter. Combining network 33 receives the outputs of the modulators 14 and 32, and after combining these outputs into a combined signal actuates superheterodyne oscillator and IF amplifier circuits 16. Circuits 16 control drive motor control 21 through frequency discriminator 27.

In the previous discussion it was pointed out that the signals from the loop antenna 10 and the sense antenna 11 are 90° out of phase. The output from the sense antenna 11 is represented by $A \sin \omega_c t$ and the output from the loop antenna 10 is represented by $B \cos \omega_c t$. Because of the 90° phase shift 13 the modulation to modulator 31 can be represented by $C \sin \omega_m t$ and that to modulator 14 can be represented by $C \cos \omega_m t$. Then the output of balance modulator 32 is (1)
$$AC \sin \omega_c t \sin \omega_m t = \frac{AB}{2} \cos (\omega_c - \omega_m)t - \frac{AC}{2} \cos (\omega_c + \omega_m)t$$

and the output from balanced modulator 14 is (2)
$$BC \cos \omega_c t \cos \omega_m t = \frac{BC}{2} \cos (\omega_c - \omega_m)t + \frac{BC}{2} \cos (\omega_c + \omega_m)t$$

The output from the combining network 33 thereof is (3)
$$AC \sin \omega_c t \sin \omega_m t + BC \cos \omega_c t \cos \omega_m t =$$
$$\frac{(A+B)C}{2} \cos (\omega_c - \omega_m)t + \frac{(B-A)C}{2} \cos (\omega_c + \omega_m)t$$

Now, whenever the signal in loop antenna 10 reverses in phase, the sign of all terms in equation 2 reverse and the output from combining network 33 is given by:

(4)
$$AC \sin \omega_c t \sin \omega_m t - BC \cos \omega_c t \cos \omega_m t =$$
$$\frac{(A-B)C}{2} \cos (\omega_c - \omega_m)t - \frac{(A+B)C}{2} \cos (\omega_c + \omega_m)t$$

Note that in the first case (Equation 3) the lower sideband is greater than the upper sideband while in the second case (Equation 4) where the signal arrives from the other side of the loop antenna, the upper sideband is larger than the lower sideband. In fact, in the particular case where the amplitude of the signal from loop antenna 10 equals the amplitude from sense antenna 11, one of the two sidebands will disappear altogether.

Thus by tuning frequency discriminator 27 to have a null frequency half way between the two sidebands, this of course is the carrier frequency, it will give a positive output for a signal from one side of loop antenna 10 and a negative output for a signal from the other side of loop antenna 10. The output of discriminator 27 can then be used to drive loop antenna 10 in the correct direction.

It has been noted that the original signal in the two balanced modulators has been lost. If the balanced modulator 32 in the sense antenna circuit is replaced with a standard amplitude modulator, all of the previous discussion will still apply but the original carrier will still come through and may be demodulated to obtain the amplitude modulation program material. A further alteration of the system now becomes obvious. Let the frequency of the low frequency oscillator 20 be determined such that the sidebands produced by the modulators can be easily separated from the AM program material and vice versa. Thus by using a system as shown in FIGURE 9 an AFC system may be applied.

If the low frequency oscillator 20 of FIGURE 8 is a sufficiently high frequency that the sidebands generated by it will not pass the bandpass filter 41 of FIGURE 9, then the loop formed by 39, 41, 42, and 40 is a complete automatic frequency control loop and will lock the carrier frequency at the null of discriminator 46. (This assumes that an AM modulator is used in FIGURE 8 instead of balanced modulator 32.) Since the carrier frequency is at null, the output from frequency discriminator 46 will be a measure of the difference in magnitude of the two sidebands and will provide the proper sense to the motor control circuits.

Although this invention has been described with respect to particular embodiments thereof, it is not to be so limited, as changes and modifications may be made therein which are within the spirit and scope of the invention as defined by the appended claims.

We claim:

1. A direction finding system comprising a loop antenna for receiving a loop signal having a carrier frequency and two sidebands, a sense antenna for receiving a radio signal, balanced modulator means for removing said carrier frequency from said loop signal, means for combining said sidebands and said radio signal to form a combined signal, means for feeding a modulating signal to said means for removing, demodulator means comprising an oscillator with a phase locked loop for demodulating said combined signal, phase detector means for detecting a phase difference between said demodulated combined signal and an output of said means for feeding to produce a phase error signal, and drive means responsive to said phase error signal for rotating said loop antenna so that said phase error signal is reduced to a null.

2. The system of claim 1 including a frequency discriminator for assuring that said system is responsive only to a predetermined range of frequencies.

3. A direction finding system comprising a rotatable loop antenna and a sense antenna, first means for receiving the output signal from said loop antenna, second means for receiving the output signal from said sense antenna, means for combining the outputs of first and second means for receiving, oscillator means connected between said first and second means for receiving, said oscillator being connected to said second means for receiving through 90° phase shift means, detector means receiving the output of said means for combining, and drive means responsive to the output of said detector means to rotate said loop antenna so that the output of said detector means is a null.

4. The system of claim 3 wherein said first and second means for receiving are first and second modulators.

References Cited

UNITED STATES PATENTS 2,589,236 3/1952 Earp _____ 343—121
3,106,710 10/1963 Stover _____ 343—121 X

OTHER REFERENCES

Henney: Radio Engineering Handbook, McGraw-Hill, 1959, pp. 12–39.

Henney: Op. cit., pp. 12–46—12–48.

Terman: Electronic and Radio Engineering, McGraw-Hill, 1955, pp. 540–541.

RODNEY D. BENNETT, *Primary Examiner.*

CHESTER L. JUSTUS, RICHARD A. FARLEY, *Examiners.*

D. C. KAUFMAN, *Assistant Examiner.*

UNITED STATES PATENT OFFICE
CERTIFICATE OF CORRECTION

Patent No. 3,390,392                                June 25, 1968

Abbott F. Mayer et al.

It is certified that error appears in the above identified patent and that said Letters Patent are hereby corrected as shown below:

Column 4, line 31, "$\frac{AB}{2}$" should read -- $\frac{AC}{2}$ --.

Signed and sealed this 2nd day of December 1969.

(SEAL)
Attest:

Edward M. Fletcher, Jr.
Attesting Officer

WILLIAM E. SCHUYLER, JR.
Commissioner of Patents